United States Patent [19]

Kitazawa

[11] Patent Number: 4,730,200

[45] Date of Patent: Mar. 8, 1988

[54] MIRROR-DRIVING MECHANISM FOR SINGLE-LENS REFLEX CAMERAS

[75] Inventor: Toshiyuki Kitazawa, Shiki, Japan

[73] Assignee: Asahi Kogaku Kogyo Kabushiki Kaisha, Tokyo, Japan

[21] Appl. No.: 944,521

[22] Filed: Dec. 22, 1986

[30] Foreign Application Priority Data

Jan. 24, 1986 [JP] Japan ............................... 61-8598[U]

[51] Int. Cl.$^4$ .................. G03B 19/12; G03B 7/099
[52] U.S. Cl. ..................................... 354/152; 354/479
[58] Field of Search ............... 354/152, 156, 479, 153, 354/154

[56] References Cited

U.S. PATENT DOCUMENTS

| | | | |
|---|---|---|---|
| 4,190,339 | 2/1980 | Arai | 354/156 |
| 4,293,209 | 10/1981 | Kurei | 354/153 |
| 4,320,945 | 3/1982 | Kimura | 354/152 |
| 4,342,508 | 8/1982 | Haraguchi | 354/152 |
| 4,492,453 | 1/1985 | Hiramatsu | 354/479 |
| 4,498,754 | 2/1985 | Ohno et al. | 354/479 |
| 4,508,439 | 4/1985 | Ohara et al. | 354/154 |

FOREIGN PATENT DOCUMENTS 56-83737 7/1981 Japan .

Primary Examiner—A. A. Mathews
Attorney, Agent, or Firm—Sandler & Greenblum

[57] ABSTRACT

Disclosed is a mirror-driving mechanism for a single-lens reflex camera, comprising a first mirror holding frame pivotally mounted on a mirror box, a second mirror holding frame pivotally mounted on the first mirror holding frame, a second mirror urging spring for urging the second mirror holding frame in a direction away from the first mirror holding frame and for urging the second mirror holding frame in a direction bringing it resilient contact with the back of the first mirror holding frame, and a second mirror defining member in engagement with an actuating pin provided on the second mirror holding frame. The resilient member which forms the second mirror defining member comprises a wire spring or a flat spring.

17 Claims, 4 Drawing Figures

MIRROR-DRIVING MECHANISM FOR SINGLE-LENS REFLEX CAMERAS

BACKGROUND OF THE INVENTION

1. Field of the Invention

The present invention relates to a mirror-driving mechanism for single-lens reflex cameras, and more specifically to an improvement in an interlocking mechanism between a first observation mirror and a second mirror for guiding luminous fluxes to the underside of a mirror box.

2. Description of the Prior Art

As a mirror-driving mechanism for a single-lens reflex camera comprising a first mirror for observation and a second mirror provided rotatably with respect to the first mirror, there has been employed a mechanism wherein when observation is made, the second mirror is brought into abutment against a locating stopper by means of an urging spring, and at the time of photographing, the second mirror is brought into engagement with a defining cam surface by the upward rotating force of the first mirror in order to reverse the urging direction of the urging spring to bring the second mirror into resilient contact with the back surface of the first mirror.

However, in conventional mechanisms, when the urging direction of the second mirror is reversed, a pin provided on a second mirror holding frame is caused to impinge upon the defining cam surface by the snap action of the urging spring, or a second mirror holding frame is caused to impinge upon the first mirror holding frame, thus generating shock noises, shocks and the like. Such shocks, vibrations or the like generated at the final stage of upward movement of the mirror often result in apparent deflection of the camera, thereby adversely affecting photography.

SUMMARY OF THE INVENTION

Such technical drawbacks as noted above with respect to prior art are overcome by the present invention. It is an object of the invention to provide an arrangement which is simple in construction and in which, when the urging direction of the urging spring was reversed, shock noises of the actuating pin resulting from the snap action of the urging spring and shocks, vibrations and the like caused thereby may be reduced, as a consequence of which any deflection of the camera during the final stage of upward movement of the mirror may be prevented from occurring in order to minimize any adverse affects on photography.

The present invention is based on the concept that an urging spring for urging a second mirror holding frame is reversed in urging direction during upward and downward movement of a first mirror holding frame, at which time the shock of an actuating pin resulting from the snap action of the urging spring is absorbed by a member of a simpler construction. The present invention is characterized in that a second mirror defining member for applying a snap action by which the urging direction of a second mirror urging spring is reversed comprises a resilient member which is subjected to resilient deformation when an actuating pin impinges upon said resilient member. According to this arrangement, when the actuating pin impinges upon the resilient member under the influence of the snap action produced by the reversal of the urging direction of the urging spring during the upward and downward movement of the first mirror holding frame, said resilient member is resiliently deformed, and therefore the shock noise of the actuating pin and the shock, vibration and the like resulting therefrom may be absorbed.

DESCRIPTION OF THE PREFERRED EMBODIMENTS

Figure 1:
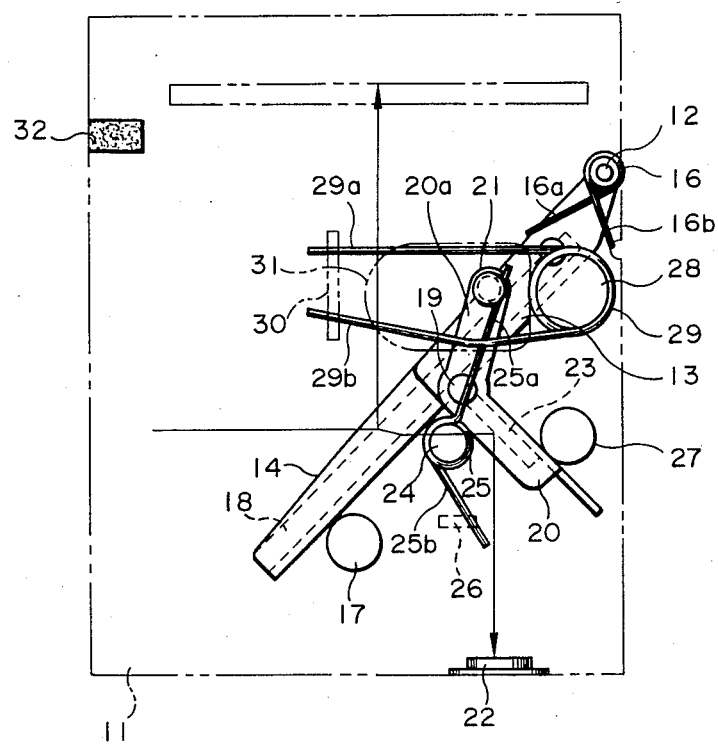
FIG. 1 is a side view showing one embodiment of the present invention at the time of observation.
Figure 2:
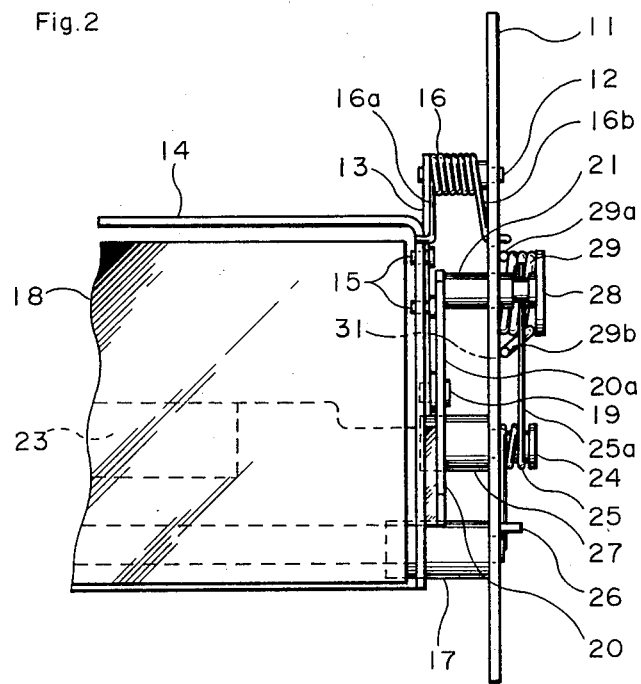
FIG. 2 is a front view of the typical part of FIG. 1.

Referring now to FIGS. 1 and 2, a pair of first mirror supporting shafts 12 are rotatably supported and extend inwardly from opposite side walls of a mirror box 11 of a single-lens reflex camera, the first mirror supporting shaft 12 having one end of a supporting plate 13 caulked i.e., attached to an inner end thereof, said supporting plate 13 having a first mirror holding frame 14 secured by means of a caulking or attaching rivet 15 to, and supported on, plate 13. Thus, the first mirror holding frame 14 may be moved upwardly and downwardly, and can be rotated about the first mirror supporting shaft 12.

On the first mirror supporting shaft 12 is mounted a first mirror controlling spring 16, one end leg 16a of which is retained on the first mirror holding frame 14 and the other end leg 16b retained on the side of the mirror box 11 so that the first mirror holding frame 14 may always be urged against a stopper pin 17 secured to the mirror box 11 in a resiliently contacting direction. This stopper pin 17 is provided to adjust and determine the position of a first mirror 18 for observation attached to the first mirror holding frame 14, that is, a position within a photographing optical path. The first mirror 18 guides to a finder the light which has passed a photographing lens at the observation position.

A second mirror shaft 19 is provided externally on the front end of supporting plate 13, and, in the second mirror shaft 19, a second mirror holding frame 20 is mounted rotatably with respect to the back of the first mirror holding frame 14. The mirror holding frame 20 has an upwardly extending portion 20a, to the end of which is provided an actuating pin 21. A second mirror 23 is attached to the second mirror holding frame 20 to guide luminous fluxes, which have passed through a half-mirror (not shown) of the first mirror 18, to a photometric and telemetric element 22 installed at a lower portion of the mirror box 11, at a predetermined rotated position of the first mirror holding frame 14 at the time of observation.

Secured to the mirror box 11 is a spring mounting shaft 24 to be positioned at the lower portion of the second mirror shaft 19, and a second mirror urging spring 25 is mounted on the spring mounting shaft 24. The second mirror urging spring 25 has one end leg 25a engaging the actuating pin 21 of the second mirror holding frame 20, and a second end leg 25b engaging a bent portion 26 of the mirror box 11 so as to urge the second holding frame 20 in a direction in which it resiliently contacts a stopper pin 27 secured on one side of the mirror box 11. This second mirror urging spring 25 is a snap action spring for reversing the urging direction of the second mirror as the first mirror supporting frame 14 ascends. The stopper pin 27 is provided to adjust and determine the position of the second mirror 23.

Also secured to the mirror box 11 is a shaft 28 to be positioned above the stopper pin 27, and a second mirror position defining spring 29 is mounted on the shaft 28. This second mirror position defining spring 29 is positioned so that opposed resilient arms 29a and 29b engage a bent flange or portion 30 of the mirror box 11 to surround the actuating pin 21 from above and below, in the observation position of FIG. 1. The spring force acts on the resilient arms 29a and 29b only in the spreading direction in order to define the maximum opening width, and the arms are capable of being resiliently deformed. The mirror box 11 is bored with an escape window 31 for the actuating pin 21. The escape window 31 has a predetermined size set so as to include a moving locus of the actuating pin 21, due to the rotation of the second mirror holding frame 20 about the second mirror shaft 19. The mirror box 11 is further provided with a mirror shock stop 32 for defining the limit position of upward movement of the first mirror holding frame 14.

The operation of the mechanism according to the present invention will be described hereinafter.

During the observation or camera viewing period, as shown in FIG. 1, the first mirror controlling spring 16 holds the first mirror holding frame 14 in resilient contact with the stopper pin 17, and the second mirror holding frame 20 resiliently contacts the stopper pin 27 via actuating pin 21. At that time, the actuating pin 21 is not in contact with the resilient arms 29a and 29b of the second mirror defining spring 29, but a suitable clearance is maintained therebetween. That is, the position of the second mirror 23 during observation is determined merely by the stopper pin 27.

When the first mirror holding frame 14 is moved upwardly around the first mirror supporting shaft 12, against the urging force of the first mirror controlling spring 16, the actuating pin 21 comes into contact with the upper resilient arm 29a of the second mirror defining spring 29 to define the movement of the second mirror 23. At that time, the direction in which the second mirror holding frame 20 is urged by the second mirror urging spring 25 is the counterclockwise direction of FIG. 1, around the second mirror shaft 19. When the first mirror holding frame 14 moves further upward and rotates, the second mirror holding frame 20 is defined in position since the actuating pin 21 is in contact with the resilient arm 29a of the second mirror defining spring 29, and the second mirror shaft 19 around which the second mirror holding frame 20 rotates moves upwardly around the first mirror supporting shaft 12.

Figure 3:
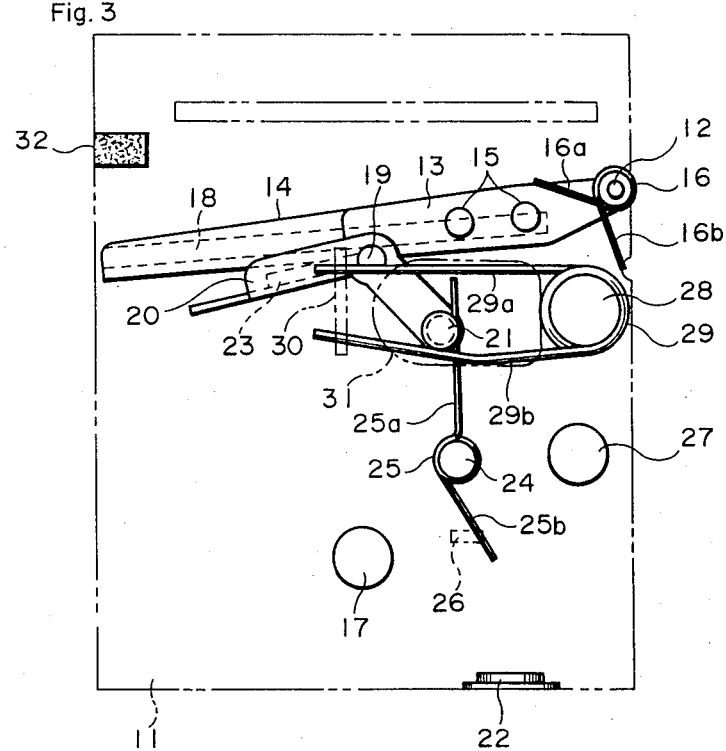
FIGS. 3 and 4 illustrate the operating state of FIG. 1, with FIG. 3 being a side view wherein an urging spring is reversed in direction during the upward movement of a mirror, and FIG. 4 being a side view at the time of photography.

When the position of the second mirror shaft 19 is displaced to a level above the actuating pin 21, the urging direction of the second mirror urging spring 25 is reversed. More specifically, the second mirror holding frame 20 is urged to be rotated in a clockwise direction around the second mirror shaft 19 via the actuating pin 21. Then, as shown in FIG. 3, the actuating pin 21 comes into contact with the other resilient arm 29b of the second mirror defining spring 29. At that time, the first mirror holding frame 14 is not yet in contact with the second mirror holding frame 20. The resilient arms 29a and 29b of the second mirror defining spring 29 are elastic, and therefore, even if the actuating pin reversed in urging direction should impinge upon the resilient arm 29b, the shock noises and shocks resulting therefrom may be absorbed to reduce the vibrations or the like.

Figure 4:
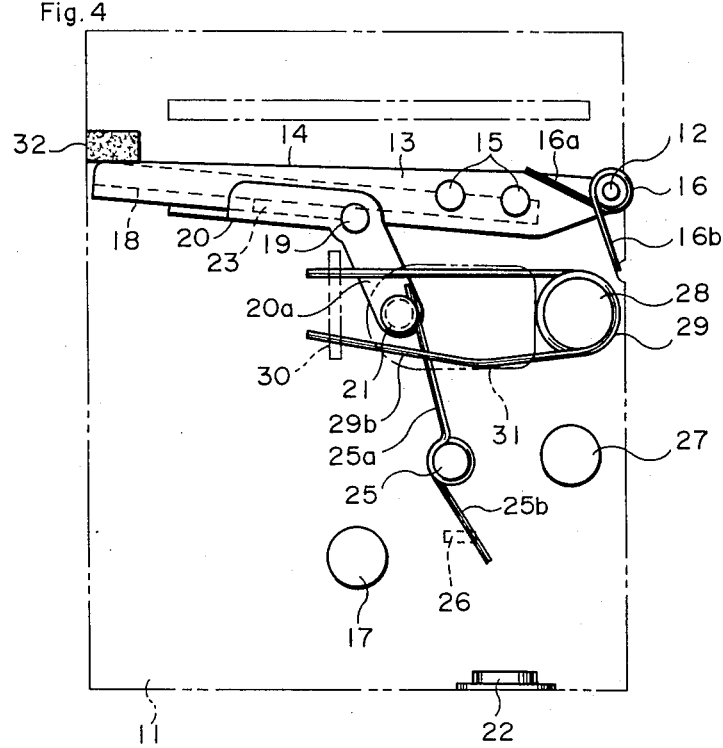

When the second mirror holding frame 20 further moves and rotates, the mirror 18 comes into contact with the mirror shock stop 32 to terminate the upward movement of the first mirror holding frame 14, as shown in FIG. 4. Then, the second mirror holding frame 20 is brought into contact with the first mirror holding frame 14 by means of the second mirror urging spring 25, reversed in urging direction as described above, and the half-mirror (not shown) of the first mirror 18 is shielded by the second mirror holding frame 20 to prevent a reverse light incidence from the finder. Since at the termination of upward movement of the mirror the actuating pin 21 maintains a suitable clearance from the second mirror defining spring 29, contact between the second mirror holding frame 20 and the first mirror holding frame 14 is not impaired. Upon completion of the upward movement of the mirror, exposure is carried out.

After completion of exposure, when a driving member (not shown) is withdrawn, the first mirror holding frame 14 begins its downward movement around the first mirror supporting shaft 12 under the influence of the urging force of the first mirror controlling spring 16. When the first mirror holding frame 14 moves downward, the actuating pin 21 comes into contact with the resilient arm 29b of the second mirror defining spring 29 to define the position of the second mirror holding frame 20. When the first mirror holding frame 14 moves further downwardly so that the second mirror shaft 19 assumes a position below the actuating pin 21, the second mirror urging spring 24 reverses its urging direction in a direction in which it moves the second mirror holding frame 20 away from the first mirror holding frame 14. The actuating pin 21 impinges upon the resilient arm 29a of the second mirror defining spring 29 under the influence of the snap action of the second mirror urging spring 25, but since the resilient arm 29a is elastic, the noises and shocks caused by the reversal of the urging direction are absorbed by the resiliency of the member in order to reduce them. When the first mirror holding frame 14 moves further downwardly, the second mirror holding frame 20 is brought into resilient contact with the stopper pin 27 by the action of the second mirror urging spring 25, and the first mirror holding frame 14 is also brought into resilient contact with the stopper pin 17 by the action of the first mirror controlling spring 16 to return to its original state.

While in the present embodiment, the second mirror defining spring 29 is formed from a wire spring, it is noted that the spring can be formed from a flat spring.

As described above, according to the present invention, a second mirror restricting member forming part of the structure for imparting a snap action, by which the urging direction of a second mirror urging spring is reversed during upward and downward movement of a first mirror holding frame, to a second mirror urging spring, is formed from a resiliently deforming resilient member, and therefore, when an actuating pin provided on the second mirror holding frame impinges thereupon, the shock noises and shocks, vibrations and the like resulting therefrom may be absorbed. Thereby, it is possible to restrain deflection of the camera at the stage of final upward movement of the mirror to reduce the influence on the photographing. Furthermore, since the resilient member can be formed from a wire spring or a flat spring, the construction of the device becomes simple.

What is claimed is:

1. A mirror-driving mechanism adapted for use with a single-lens reflex camera comprising a first mirror holding frame adapted to be pivotably mounted on a mirror box of said single-lens reflex camera, said first mirror holding frame having a back surface and being positioned within a photographing optical path during a camera observation period in order to guide light from an object to a finder optical system during said period, a second mirror holding frame pivotably mounted on said first mirror holding frame in order to guide light having passed through a first mirror to a light receiving element, a second mirror urging spring which urges, during said observation period, said second mirror holding frame in a direction away from said first mirror holding frame, said second mirror urging spring urging said second mirror holding frame into resilient contact with the back surface of the first mirror holding frame when the first mirror holding frame rotatably moves upwardly during photographing, and a second mirror restricting member which engages, during upward and downward movement of said first mirror holding frame, an actuating pin provided on said second mirror holding frame so as to thereby restrict the movement of said second mirror holding frame, said restricting member and said pin comprising at least a part of means for imparting to said second mirror urging spring a snap action to change the urging direction of the second mirror urging spring, said second mirror restricting member comprising a resilient member capable of undergoing resilient deformation when said actuating pin impinges on said resilient member.

2. The mirror-driving mechanism as defined in claim 1, wherein the resilient member forming said second mirror defining member comprises a wire spring or a flat spring.

3. The mirror-driving mechanism as defined in claim 1, wherein said first mirror holding frame is secured to a supporting plate, wherein one end of said supporting plate is attached to an inner end of a first mirror supporting shaft which is rotatably supported on a side wall of a mirror box.

4. The mirror-driving mechanism as defined in claim 1, wherein said second mirror holding frame is rotatably mounted on a second mirror shaft provided externally of the supporting plate, said second mirror holding frame having an upwardly extending portion on one end of which is provided an actuating pin.

5. The mirror-driving mechanism as defined in claim 1, wherein said second mirror urging spring is mounted on a spring mounting shaft secured by the mirror box, said second mirror urging spring having one end leg engaged with the actuating pin of the second mirror holding frame and the other end leg engaged with a bent portion of the mirror box to urge the second mirror holding frame in a direction of bringing it into resilient contact with a stopper pin secured to the mirror box.

6. The mirror-driving mechanism as defined in claim 5, wherein said second mirror urging spring comprises a snap action spring for reversing the urging direction of said second mirror urging spring.

7. The mirror-driving mechanism as defined by claim 1, wherein said second mirror restricting member is mounted on a shaft positioned above the stopper pin, said second mirror restricting member having opposed resilient arms engaged with a bent portion of the mirror box.

8. A mirror-driving mechanism adapted to be used in a single lens reflex camera, said mirror-driving mechanism comprising:
    (a) a first mirror holding frame movably mounted on a mirror box, said first mirror holding frame being adapted to hold a first mirror;
    (b) a second mirror holding frame pivotably mounted on said first mirror holding frame, said second mirror holding frame being adapted to hold a second mirror, said second mirror being positionable along a first side of said second mirror holding frame;
    (c) means for biasing said second mirror holding frame in a direction in which said second mirror will be separated from said first mirror holding frame during a camera observation period, and in a direction which said second mirror will approach said first mirror holding frame when said first mirror holding frame moves upwardly; and
    (d) means for restricting pivoting movement of said second mirror holding frame by engaging an actuating member attached to a second side of said second mirror holding frame during upward and downward movement of said first mirror holding frame, wherein said restricting means comprises a resilient member adapted to undergo resilient deformation when said actuating member impinges upon said resilient member.

9. A mirror-driving mechanism in accordance with claim 8, wherein said first mirror comprises means for guiding light towards a finder optical system, and said second mirror comprises means for guiding light towards a light receiving element.

10. A mirror-driving mechanism in accordance with claim 8 further comprising a first mirror controlling spring for controlling pivoting movement of said first mirror holding frame.

11. A mirror-driving mechanism in accordance with claim 8, wherein said resilient member comprises a substantially U-shaped spring positioned in a substantially horizontal position, said U-shaped spring having first and second resilient legs, said actuating member comprising an actuating pin which is adapted to selectively engage said legs as said first mirror holding frame is pivoted.

12. A mirror-driven mechanism in accordance with claim 8, wherein said second mirror holding frame further comprises an outwardly extending portion to which said actuating member is attached, said actuating member comprising an actuating pin.

13. A mirror-driving mechanism in accordance with claim 8, wherein said restricting means and said means for biasing said second mirror holding frame together comprise means for imparting a snap action to said actuating member and thereby comprise means for reversing the direction in which said second mirror holding frame is rotatably biased by said biasing means during upward and downward movement of said first mirror holding frame.

14. A mirror-driving mechanism in accordance with claim 13, wherein said restricting means comprises means for restricting movement of said actuating member and thereby comprises means for reversing the relative positions of said actuating member and a pivot which pivotably connects said second mirror holding frame to said first mirror holding frame, when said first mirror holding frame moves upwardly and downwardly.

15. A mirror-driving mechanism in accordance with claim 14, wherein said mechanism comprises means for imparting snap action to said actuating pin, said restricting means comprising at least a part of said snap action imparting means.

16. A mirror-driven mechanism in accordance with claim 8, wherein said restricting means comprises a substantially U-shaped member having two deformable legs adapted to engage said actuating member.

17. A mirror-driving mechanism adapted to be used with a single lens reflex camera, said mirror driving mechanism comprising:
   (a) a first mirror holding frame adapted to hold a first mirror;
   (b) a second mirror holding frame pivotably mounted on said first mirror holding frame, said second mirror holding frame being adapted to hold a second mirror;
   (c) an actuating member attached to and extending outwardly from said second mirror holding frame;
   (d) means for restricting movement of said actuating member as said mirror holding frame moves upwardly and downwardly, said restricting means comprising a resilient member; and
   (e) means for biasing said second mirror holding frame in a first direction such that said second mirror approaches said first mirror holding frame and in a second direction in which said second mirror is separated from said first mirror holding frame.

* * * * *